United States Patent
Van Scoy

[11] 3,720,138
[45] March 13, 1973

[54] OPERATOR
[75] Inventor: Davis A. Van Scoy, Houston, Tex.
[73] Assignee: Helmerich & Payne, Inc., Houston, Tex.
[22] Filed: Feb. 4, 1971
[21] Appl. No.: 112,579

[52] U.S. Cl............................91/1, 91/167 R, 91/176
[51] Int. Cl......F01b 25/26, F01b 31/12, F15b 11/18
[58] Field of Search ....91/167 A, 167 R, 176, 1, 177; 92/66

[56] References Cited

UNITED STATES PATENTS

| | | |
|---|---|---|
| 2,687,118 | 8/1954 | Bennett....................................91/176 |
| 578,723 | 3/1897 | Clark........................................91/167 |
| 2,911,956 | 11/1959 | Smith, Jr. ...........................91/167 A |
| 2,988,057 | 6/1961 | Litz .....................................91/167 A |
| 3,050,247 | 8/1962 | Ljunggren ............................91/167 |
| 3,289,544 | 12/1966 | Daniels................................91/167 A |

Primary Examiner—Paul E. Maslousky
Attorney—Ned L. Conley and Murray Robinson

[57] ABSTRACT

An apparatus for operating a valve either 90° or 180° comprising a first hydraulic cylinder driving a first arm, and a second hydraulic cylinder mounted on the first arm and driving a second arm and including limit switches to indicate the extremes of valve operation and a hydraulic system to supply fluid to the hydraulic cylinders.

4 Claims, 3 Drawing Figures

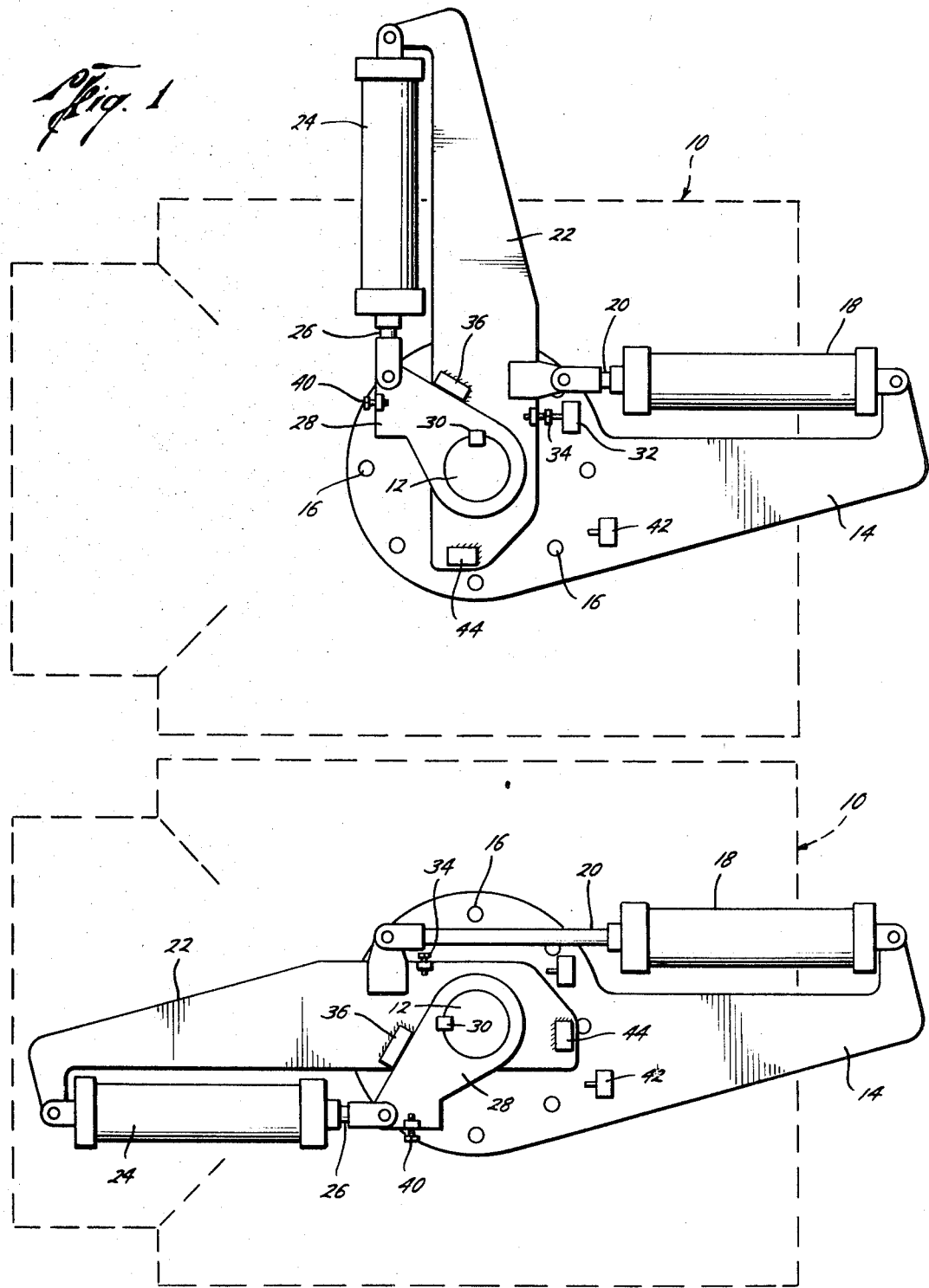

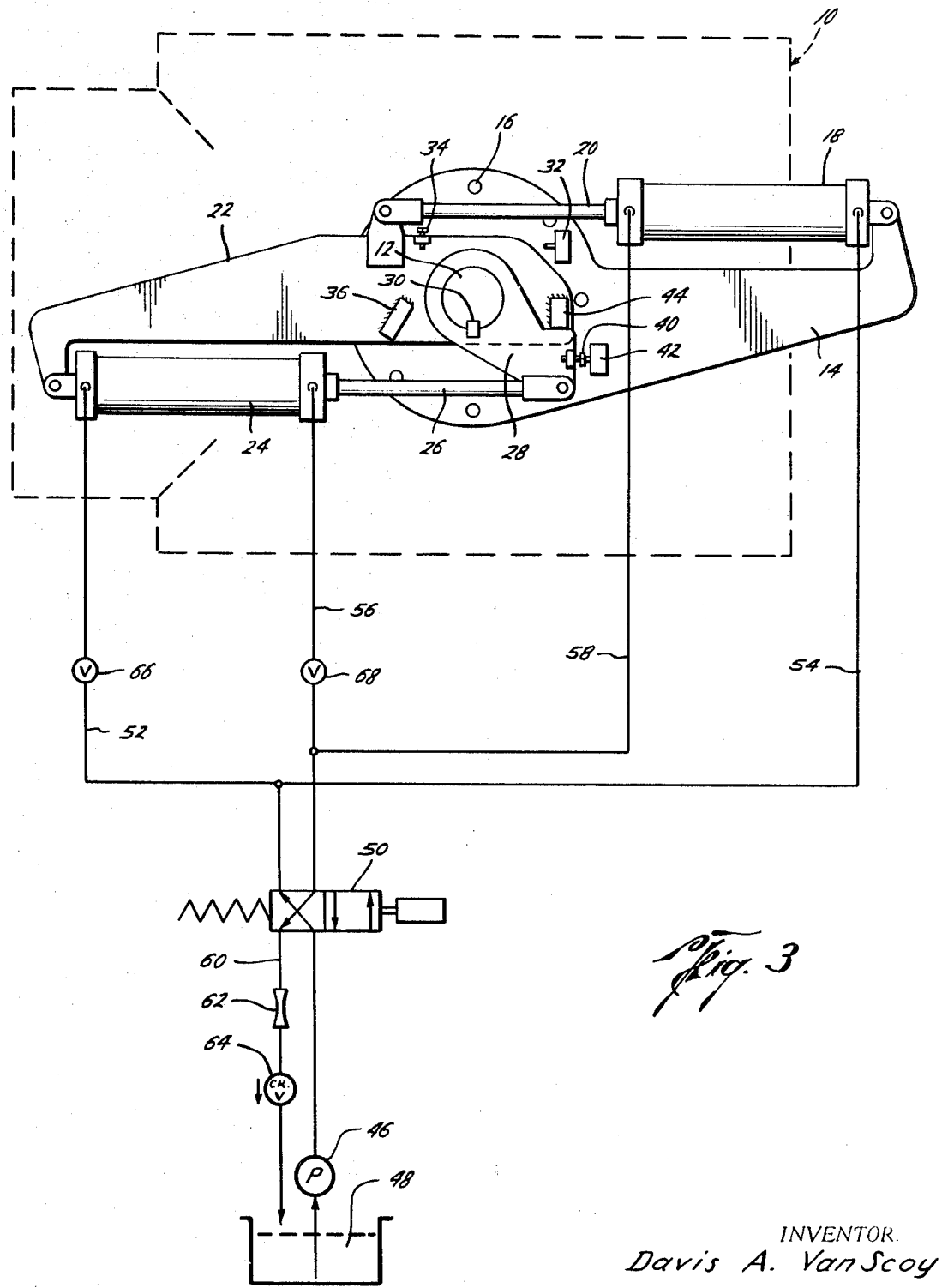

3,720,138

OPERATOR

CROSS REFERENCE TO RELATED APPLICATION

The apparatus of this invention is useful in connection with the apparatus disclosed and claimed in my copending application Ser. No. 697,979 filed Jan. 15, 1968, now U.S. Pat. No. 3,580,539.

BACKGROUND OF THE INVENTION

1. Field of the Invention

This invention relates to operators for valves or other devices having a rotatable shaft adapted to be engaged by an operating mechanism.

2. Description of the Prior Art

Fluid-powered actuators, and especially hydraulic-powered actuators, have heretofore been used in many installations for causing the rotation of a rotary member of a machine. Such devices usually contain some means for converting linear motion to rotary motion. In the case of plug valves, for example, such devices have been used for many years to rotate the stem of the plug valve, and thereby the plug therein, 90° in order to move the valve from its open position to its closed position and vice versa.

In recent years a valve type machine has been devised which requires both 90° movement and 180° movement. Such an apparatus is shown, for example, in the patents to Craven, No. 3,288,163, to Piccardo, No. 3,463,448 and to Allen, No. 3,220,432. In the systems shown in those patents, such as pipelines, for example, means are provided for introducing a solid article into the pipeline so that it may be carried along the pipe by the flowing fluids. In one such system a U-shaped meter prover loop is installed in the pipeline with both legs of the loop being connected by a cross communicating conduit in which is installed a device for introducing an article at one end of the meter prover loop and removing it as it arrives at the other end. This device, sometimes called a transfer chamber, may take the form of a structure of the general type found in ball valves except that the bore in the rotatably mounted ball extends only partially therethrough to form a pocket, and the housing is provided with a door which may be opened to the exterior for placement therein of a solid member such as a sphere. Thus, with the ball turned to expose the pocket to the outside door a sphere, often in the form of a large inflated rubber ball, may be inserted in the pocket of the ball which is then rotated partially to expose the pocket to that branch of the communicating passage which opens into the entrance side of the meter prover loop. Then the spherical article is carried around the loop by the fluid flowing therein and the time of its movement between spaced detectors is measured and recorded in order to determine flow rate and to check meter accuracy. After the spherical article passes around the loop, it is deflected at the outlet side into the return branch of the cross communicating branch. At this time the pocketed ball is turned with its pocket exposed to the return branch to receive the returning sphere.

As may be seen from the foregoing and from the disclosures of the patents previously referred to herein, it is necessary in such a system that the ball valve device be rotatable both 90° and 180° from an original position. Operating devices have previously been available for 90° operation, and other devices have been known for converting longitudinal motion of a fluid cylinder to rotary motion of a valve or the like (For example, see U. S. Pat. Nos. 3,007,490, 3,204,920, 3,237,916, 3,317,179, 3,386,338 and 3,474,829), but none has heretofore been devised which will simply and accurately provide precisely 90° and 180° operation.

SUMMARY OF THE INVENTION

This invention is in apparatus utilizing two hydraulic cylinders operating in series to selectively provide 90° and 180° operation of a rotary device.

BRIEF DESCRIPTION OF THE DRAWING

FIG. 1 is a plan view of one embodiment of the invention in a first position;

FIG. 2 is a plan view of the embodiment of FIG. 1 shown in a second position; and FIG. 3 is a plan view of the embodiment of FIG. 1 shown in a third position, which also includes a schematic representation of one embodiment of a hydraulic system utilized therewith.

DESCRIPTION OF THE PREFERRED EMBODIMENTS

In the embodiment shown in the drawing the apparatus of this invention is shown as affixed to a valve or other device 10, shown in broken lines, which has a stem 12 extending upwardly therefrom. In the embodiment of the operator of this invention depicted in the drawings an arm 14 is bolted to the body of the valve 10, as by means of bolt holes 16, and extends radially outwardly from the stem 12. The arm 14 has pivotally connected to its outer end a fluid cylinder 18. The fluid cylinder extends inwardly toward the valve stem, parallel to the arm 14 in the positions shown in FIGS. 1 and 2, and the piston rod 20 thereof is pivotally connected to a second arm 22 at a point which is on a radius from the stem 12 which is at approximately 45° to the cylinder 18. Arm 22 is pivotally mounted around the stem 12 and extends radially outwardly therefrom. A hydraulic cylinder 24 is pivotally connected to its outer end, and extends inwardly toward the valve stem, parallel to the arm 22 in the positions shown in the drawing. The piston rod 20 of cylinder 20 is, in the embodiment shown, connected to arm 22 intermediate the point of pivotal connection around the stem 12 and the end to which the fluid cylinder 24 is attached. The piston rod 26 of fluid cylinder 24 is in turn pivotally connected to the outer end of the third arm 28 which is mounted on stem 12, being keyed thereto by a key 30 for rotation with the stem. The arm 28 extends radially from the stem 12, and the piston rod 26 is connected to it at a point on a radius which is at approximately 45° to the cylinder 24.

In the position of the elements shown in FIG. 1, a limit switch 32 on the arm 14 is engaged by the head of the bolt 34 which is adjustably mounted on arm 22. At this position arms 14 and 22 are at approximately 90° to each other and the line between the center of the stem 12 and the pivot point of the piston rod 20 with arm 22 is at approximately a 45° angle with the axis of the fluid cylinder 18 and with the arm 14.

There is also approximately a 45° angle between the arm 28 and the arm 22, with the line between the center of the stem 12 and the pivot connecting piston rod 26 with the arm 28 forming approximately a 45° angle with the arm 22.

A dog 36 is rigidly affixed to the arm 22, as by welding, in such a position that when the arms are in the relative positions shown in FIG. 1, with the pistons of the fluid cylinders substantially fully retracted, the dog 36 engages the edge of arm 28.

In FIG. 2 the hydraulic cylinder 18 is shown with its piston rod 20 fully extended so that arms 14 and 22 are substantially parallel to each other. In this position the line between the center of stem 12 and the pivot point of piston rod 20 with arm 22 is approximately a 45° angle with the arm 22. The dog 36 has engaged arm 28 and caused it to pivot approximately 90°, thereby causing the stem 12 to rotate approximately 90°. Thus, to move from the position shown in FIG. 1 to that shown in FIG. 2 arms 22 and 28 move together, with substantially no relative motion therebetween.

In the position shown in FIG. 3 the fluid cylinder 24 has also been actuated to extend its piston rod 26, thereby causing arm 28 to pivot an additional 90° so that stem 12 is rotated an additional 90°. Since arm 22 is pivotally mounted on stem 12, as by means of a bearing around the stem itself or around a hub of arm 28, there is no further rotation of arm 22.

At the position shown in FIG. 3 a bolt 40 on arm 28 engages a limit switch 42, for a purpose which will hereinafter be explained. In the position shown in FIG. 3 the arm 28 also engages a dog 44 which is rigidly affixed to the arm 22, as by welding. The dog 44 constitutes a positive stop to prevent over travel of arm 28.

Thus, it will be seen that when both of the fluid cylinders 18 and 24 are actuated to fully extend their piston rods the arm 28, and therefore stem 12, is pivoted approximately 180°. It is apparent that the two fluid cylinders could be actuated separately or together, and that either could be operated before the other.

The limit switch 42 provides a signal indicating that the arm 28 has pivoted 180° to the position shown in FIG. 3. Such a signal may be used to initiate other operations or merely as advice to the operator.

When the flow of fluid to the cylinders 18 and 24 is applied to the opposite ends of the cylinders the piston rods are retracted and the arms 28 and 22 return to their original positions. The dog 44 is positioned to engage arm 28, so that as soon as arm 22 begins to move, the dog 44 engages arm 28 and moves this arm with arm 22. Of course, when the fluid cylinder 24 begins to operate then dog 44 will not function.

When both of arms 22 and 28 have returned to their original positions the bolt head 34 engages limit switch 32, which provides a signal indicating that the apparatus has returned to the position shown in FIG. 1.

In FIG. 3 there is also shown a schematic representation of one hydraulic system for operating the fluid cylinders. In the system there shown a pump 46 pumps hydraulic fluid from a supply tank 48 through a four-way valve 50 to conduits 52 and 54 providing hydraulic fluid to the outer ends of the cylinders 18 and 24, or in another position of the four-way valve, to conduits 56 and 58, providing fluid to the inner ends of the hydraulic cylinders. Return fluid from the hydraulic cylinder passes through the same lines and through the four-way valve 50 and conduit 60 in which there is provided a conventional adjustable flow control 62 and a check valve 64 which allows flow of fluid back into the tank 48.

The lines 52 and 56 leading to hydraulic cylinder 24 are provided with valves 66 and 68 which may be closed if it is desired to operate fluid cylinder 18 alone, thereby achieving a 90° rotation of the valve stem 12.

It is apparent that the four-way valve 50 may be solenoid operated and may be actuated by a suitable manual or automatic electrical switch. The limit switches 32 and 42 may provide signals to an operator to shut off the pump 46, or they may automatically actuate a switch to turn the pump off. Such systems are well known in the art and need not be further described here.

Thus, there has been provided an operator for a valve or other mechanism having a rotary shaft which is suitable for providing either 90° or 180° rotation of the shaft. While preferred embodiments of the invention have been shown and described herein the invention is not limited to these embodiments specifically described but only by the scope of the appended claims.

I claim:

1. Apparatus for causing up to 180° rotation of a shaft rotatably mounted in a machine, including
   a first arm adapted to be mounted on said machine and fixed against movement relative thereto,
   a second arm rotatably mountable on said shaft,
   a third arm adapted to be mounted on said shaft and fixed against movement relative thereto,
   a first fluid cylinder containing a piston rod, said first cylinder pivotally attached to one of said first and second arms and having its piston rod pivotally attached to the other of said first and second arms,
   a second fluid cylinder containing a piston rod, said second cylinder pivotally attached to one of said second and third arms and having its piston rod pivotally attached to the other of said second and third arms,
   means for supplying fluid to said fluid cylinders, and
   means for controlling the flow of fluid to said fluid cylinders to cause each of said piston rods to be moved sufficiently to rotate each of the second and third arms 90° with respect to the first and second arms, respectively.

2. Apparatus as defined by claim 1 wherein the control means is adapted to separately actuate said fluid cylinders.

3. Apparatus as defined by claim 1 and including
   means on said second and third arms engageable upon actuation of said first fluid cylinder without actuation of said second fluid cylinder to cause said third arm to rotate with said second arm.

4. Apparatus as defined by claim 1 and including
   signal means adapted to be energized upon movement of said third arm 180°.

* * * * *